United States Patent
Cazaux et al.

(10) Patent No.: US 10,796,460 B2
(45) Date of Patent: Oct. 6, 2020

(54) METHOD AND ELECTRONIC DEVICE FOR MANAGING THE DISPLAY OF AN AERONAUTICAL MAP, RELATED COMPUTER PROGRAM AND DISPLAY SYSTEM

(71) Applicant: THALES, Courbevoie (FR)

(72) Inventors: Patrick Cazaux, Merignac (FR); Hervé Leconte, Merignac (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 16/575,080

(22) Filed: Sep. 18, 2019

(65) Prior Publication Data

US 2020/0094984 A1    Mar. 26, 2020

(30) Foreign Application Priority Data

Sep. 25, 2018    (FR) .................................. 18 00993

(51) Int. Cl.
*G06T 11/00*    (2006.01)
*G01C 21/20*    (2006.01)

(52) U.S. Cl.
CPC .............. *G06T 11/00* (2013.01); *G01C 21/20* (2013.01)

(58) Field of Classification Search
None
See application file for complete search history.

(56) References Cited

U.S. PATENT DOCUMENTS

| | | | |
|---|---|---|---|
| 6,092,009 A * | 7/2000 | Glover | G01C 5/005 340/970 |
| 7,612,688 B1 * | 11/2009 | Vigeant-Langlois | G01C 23/00 340/971 |
| 2002/0130906 A1 | 9/2002 | Miyaki | |
| 2006/0238376 A1 * | 10/2006 | Khatwa | G08G 5/0021 340/970 |
| 2009/0055774 A1 | 2/2009 | Joachim | |
| 2010/0218114 A1 * | 8/2010 | Gamet | G01C 23/00 715/746 |

(Continued)

FOREIGN PATENT DOCUMENTS

| | | |
|---|---|---|
| EP | 2 884 231 A1 | 6/2015 |
| FR | 2 920 580 A1 | 3/2009 |
| WO | WO 2006/115884 A1 | 11/2006 |

OTHER PUBLICATIONS

French Search Report issued in French Patent Application No. 18 00993 dated Jun. 18, 2019.

*Primary Examiner* — Yanna Wu
(74) *Attorney, Agent, or Firm* — Arent Fox LLP (57) ABSTRACT

This method of managing the display of an aeronautical map from cartographical data is implemented by an electronic management device and comprises the following steps:

acquiring a display scale of the map;

determining a set of symbol(s) representative of obstacle(s) to be displayed, the obstacle(s) being included in the cartographical data, where:

if the distance between two obstacles is greater than a visible distance threshold that depends on the display scale, two separate symbols are determined for these obstacles, each being representative of a respective obstacle, and if the distance between two obstacles is less than or equal to the visible distance threshold, a symbol representative of a grouping of obstacles is determined for these obstacles.

16 Claims, 4 Drawing Sheets

(56) References Cited

U.S. PATENT DOCUMENTS

2013/0321269 A1 12/2013 Beaurepaire
2015/0369623 A1 12/2015 Blumenberg et al.

* cited by examiner

METHOD AND ELECTRONIC DEVICE FOR MANAGING THE DISPLAY OF AN AERONAUTICAL MAP, RELATED COMPUTER PROGRAM AND DISPLAY SYSTEM

CROSS-REFERENCE TO RELATED APPLICATIONS

This application is a U.S. non-provisional application claiming the benefit of French Application No. 18 00993, filed on Sep. 25, 2018, which is incorporated herein by reference in its entirety.

FIELD

The present invention relates to a method for managing the display of an aeronautical map from cartographic data, the method being implemented by an electronic management device for managing the display.

The invention also relates to a non-transitory computer-readable medium including a computer program including software instructions which, when executed by a computer, implement such a display management method.

The invention also relates to an electronic management device for managing the display of an aeronautical map.

The invention also relates to an electronic display system for displaying an aeronautical map, comprising a display screen and such an electronic management device for managing an aeronautical map configured to manage the display of the aeronautical map on the display screen.

The invention then relates to the field of man-machine interfaces (MMI) for piloting an aircraft, preferably intended to be installed in an aircraft cockpit.

The invention in particular relates to the display of aeronautical maps, for example showing aeronautical missions, with a two-dimensional (2D) display in top view.

The display of such an aeronautical map is intended to be used on the ground to prepare an aeronautical mission, or on board the aircraft on an on-board display system for preparation, monitoring and/or replanning of the aeronautical mission.

The display of such an aeronautical map aims to provide a clear and coherent overview of the situation, in particular for obstacles.

BACKGROUND

The display of obstacles is an important function for the anticipation and safety of the aeronautical mission at medium/low altitude. Depending on the geographical zone shown on the display, in particular positions and size of the zone, the number of obstacles to be displayed may vary in significant proportions.

Each obstacle is typically an individual obstacle, a group of obstacles, a wind turbine, or a group of wind turbines, for example within the meaning of appendix 4 of the ICAO (International Civil Aviation Organization) or the Aeronautical Chart User's Guide of the American Federal Aviation Administration (FAA).

When the number of obstacles is high, symbols representative of the respective obstacles then tend to become superimposed on one another and/or on the other displayed cartographical data. The displayed information is no longer useful because it becomes unreadable.

Known then from document EP 2 884 231 A1 is a system for showing cartographical indications for an aircraft, including a cartographical database, a graphic computer, a display device and means for selecting a scale of the displayed cartographical data, each cartographical datum having a first symbol. The first symbol is associated with the first scale depending on said cartographical datum, and the first symbol is displayed only when the selected scale is greater than or equal to the first scale, the first symbol no longer being displayed when the selected scale is below the first scale. Additionally, each cartographical datum includes a second symbol associated with a second scale below the first scale, and when the selected scale is comprised between the first scale and the second scale, the second symbol is displayed, the latter no longer being displayed when the selected scale is below the second scale.

This system is used to display navigation data, such as airports or heliports, navigation beacons, waypoints of a flight plan, procedures of the airway type, or airspaces.

However, such a system for showing cartographical indications is not very suitable for displaying obstacles.

SUMMARY

The aim of the invention is then to propose a method and an electronic device for managing the display of an aeronautical map, making it possible to improve the display of obstacles.

To that end, the invention relates to a method for managing the display of an aeronautical map from cartographical data, the method being implemented by an electronic management device and comprising the following steps:
- acquiring a display scale of the map;
- determining a set of symbol(s) representative of obstacle(s) to be displayed, the obstacle(s) being included in the cartographical data, where:
  - if the distance between two obstacles is greater than a visible distance threshold that depends on the display scale, two separate symbols are determined for these obstacles, each being representative of a respective obstacle, and
  - if the distance between two obstacles is less than or equal to the visible distance threshold, a symbol representative of a grouping of obstacles is determined for these obstacles.

Thus, the method for managing the display according to the invention makes it possible, when the distance between two obstacles is less than or equal to the visible distance threshold, to display the obstacles in a grouped manner via the symbol representative of a group of obstacles. This symbol representing a group then replaces the respective symbols of these obstacles, i.e., is then intended to be displayed in place of the respective symbols of these obstacles.

In this case of a small distance between two obstacles in light of the visible distance threshold, with respect to the display scale (the latter typically being selected by the user), the display management method according to the invention therefore makes it possible to prevent the respective symbols of the obstacles from being displayed in a superimposed manner, causing a loss of readability; or one of the obstacles from no longer being shown, causing a loss of information.

The display management method according to the invention then makes it possible to avoid an undervaluation of the danger resulting from the presence of several obstacles, each obstacle representing a potential danger for the aircraft. Indeed, due to the symbol representing a group, the user knows that several obstacles are present, whereas with a display management method according to the state of the art, a single obstacle is sometimes displayed in this situation with several obstacles.

Additionally, when the highest altitude among the grouped obstacles is further associated with the representative symbol, this also allows the user to know the maximum altitude overall for the grouped obstacles, thus providing additional useful information for the safety of the flight.

According to other advantageous aspects of the invention, the display management method comprises one or more of the following features, considered alone or according to all technically possible combinations:

- if the distance between two obstacles is less than or equal to the visible distance threshold, a symbol associated with said grouped obstacles is determined for these obstacles;
- if the distance between two obstacles is less than or equal to the visible distance threshold, the highest altitude among the grouped obstacles is further associated with the determined representative symbol, to be displayed next to said symbol;
- the method further comprises a step for predetermining, for each respective obstacle included in the cartographical data, a first distance equal to the distance between the respective obstacle and the closest obstacle among the other obstacles, included in the cartographical data, that have an altitude lower than or equal to that of the respective obstacle, and
- during the determining step, if the first distance is less than or equal to the visible distance threshold, a symbol representative of a group is determined for at least the respective obstacle and the closest obstacle, the altitude associated with the determined representative symbol being greater than or equal to that of the respective obstacle;
- the method further comprises a step for predetermining, for each respective obstacle included in the cartographical data, a second distance equal to the distance between the respective obstacle and the closest obstacle among the other obstacles, included in the cartographical data, that have an altitude greater than that of the respective obstacle, and
- during the determining step, if the second distance is less than or equal to the visible distance threshold, a symbol representative of a group is determined for at least the respective obstacle and the closest obstacle, the altitude associated with the determined representative symbol then being greater than or equal to that of the closest obstacle;
- each obstacle is chosen from among the group consisting of: an individual obstacle, a group of obstacles, a wind turbine and a group of wind turbines;
- preferably according to appendix 4 of the ICAO or the FAA Aeronautical Chart User's Guide;
- the method further comprises a step for displaying the aeronautical map, the displayed map including the determined set of symbol(s) representing obstacle(s).

The invention also relates to a non-transitory computer-readable medium including a computer program including software instructions which, when executed by a computer, implement a display management method, as defined above.

The invention also relates to an electronic display management device configured to manage the display of an aeronautical map from cartographical data, comprising:

- a computing module configured to acquire a display scale of the map;
- a determining module configured to determine a set of symbol(s) representative of obstacle(s) to be displayed, the obstacle(s) being included in the cartographical data, where:
  - if the distance between two obstacles is greater than a visible distance threshold that depends on the display scale, two separate symbols are determined for these obstacles, each being representative of a respective obstacle, and
  - if the distance between two obstacles is less than or equal to the visible distance threshold, a symbol representative of a grouping of obstacles is determined for these obstacles.

The invention also relates to an electronic display system for displaying in aeronautical map, the system comprising a display screen and an electronic management device configured to manage the display of the aeronautical map on the display screen, the electronic management device being as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
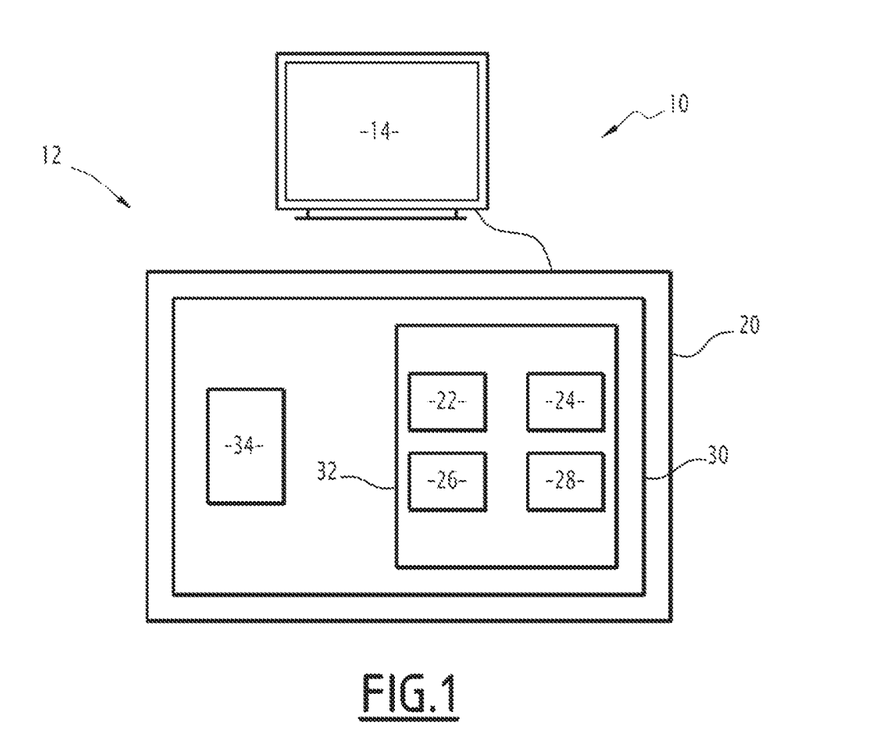
FIG. 1 is a schematic view of an electronic display system according to the invention, configured to display an aeronautical map.

In FIG. 1, an electronic display system 10 is configured to display an aeronautical map from map data. The electronic display system 10 is for example installed on board an aircraft 12. In a variant, the electronic display system 10 is arranged outside the aircraft 12, and is for example arranged on the ground.

The electronic display system 10 comprises a display screen 14 and an electronic management device 20 that is configured to manage the display of the aeronautical map on the display screen 14, the management device 20 being connected to the display screen 14.

The aircraft 12 is for example an airplane. In a variant, the aircraft 12 is a helicopter. Also in a variant, the aircraft 12 is a drone piloted remotely by a pilot, the electronic display system 10 then being arranged on the ground, outside the aircraft 12.

The electronic management device 20 is configured to manage the display of the aeronautical map, the aeronautical map being displayed in two dimensions and in top view, said map for example showing aeronautical missions.

The electronic management device 20 comprises a computing module 22 configured to acquire a display scale R and a determining module 24 configured to determine a set of symbol(s) representative of obstacle(s) 25A, 25B to be displayed, the obstacle(s) being included in the cartographical data.

As an optional addition, the electronic management device 20 comprises a predetermining module 26 configured to predetermine, for each respective obstacle included in the cartographical data, a first distance ntgd and/or a second distance ndd.

Also as an optional addition, the electronic management device 20 comprises a display module 28 configured to display the aeronautical map on the display screen 14, the displayed map including the set of symbol(s) representing obstacle(s) 25A, 25B determined by the determining module 24.

In the example of FIG. 1, the electronic management device 20 comprises an information processing unit 30, for example made up of a memory 32 and a processor 34 associated with the memory 32.

In the example of FIG. 1, the computing module 22 and the determining module 24, as well as, optionally and additionally, the predetermining module 26 and the display module 28, are each made in the form of a software component, executable by the processor 34. The memory 32 of the electronic management device 20 is then capable of storing computing software configured to acquire the display scale R, and determining software configured to determine the set of symbol(s) representing obstacle(s) 25A, 25B to be displayed. As an optional addition, the memory 32 of the electronic management device 20 is capable of storing predetermining software configured to predetermine, for each respective obstacle included in the cartographical data, the first distance ntgd and/or the second distance ndd, and display software configured to display the aeronautical map on the display screen 14, the displayed map including the set of symbol(s) representing obstacle(s) 25A, 25B determined by the determining software. The processor 34 is then capable of executing each of the software applications from among the computing software and the determining software, as well as, by way of optional addition, the predetermining software and the display software.

In a variant that is not shown, the computing module 22 and the determining module 24, as well as, optionally and additionally, the predetermining module 26 and the display module 28, are each made in the form of a programmable logic component, such as an FPGA (Field Programmable Gate Array), or in the form of a dedicated integrated circuit, such as an ASIC (Applications Specific Integrated Circuit).

When the electronic management device 20 is made in the form of one or several software programs, i.e. in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The computing module 22 is configured to acquire the display scale R. The display scale R corresponds to a magnification level in the image. As an example, and by convention in the present description, the higher the value of the display scale R is, the higher the ratio is between a diagonal 36 of the image to be displayed and a size of an object to be displayed, such as a radius 38 of a circle 40 encompassing a symbol representing an obstacle 25A, 25B. In other words, the higher the value of the display scale R is, the lower the magnification will be in the image to be displayed.

Figure 3:
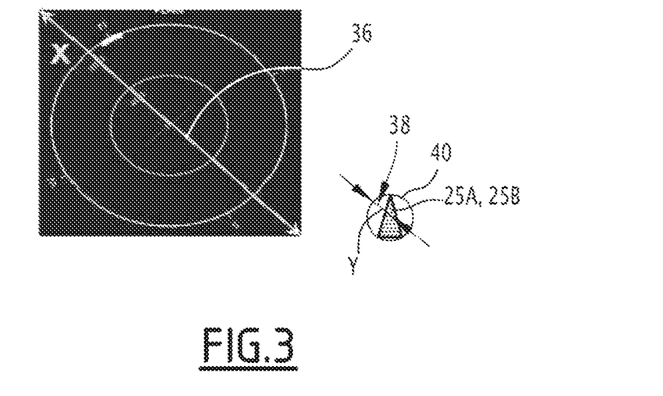
FIG. 3 is a view illustrating the determination of a parameter relative to the diagonal of an image to be displayed and a parameter relative to the symbol(s) representative of obstacle(s) to be displayed.

As an optional addition, the computing module 22 is configured to compute, based on the display scale R, a visible distance threshold S on the map. According to this optional addition, the computing module 22 is for example configured to compute the visible distance threshold S according to the following equation:

$$S = R \times \frac{Y}{X} \quad (1)$$

where R represents the display scale,

X represents the length of the diagonal 36 of the image to be displayed, and

Y represents the length of the radius 38 of the circle 40 encompassing the largest of the symbols representing obstacles 25A, 25B.

These lengths X and Y are illustrated as an example in FIG. 3. These lengths X and Y are for example expressed in pixels, or expressed in mm, or expressed in inches.

The determining module 24 is configured to determine the set of symbol(s) representing obstacle(s) 25A, 25B to be displayed, and is in particular configured to implement a first rule according to which if the distance between two obstacles is greater than the visible distance threshold S depending on the display scale R, two separate symbols 25A are determined for these obstacles, each representing a respective obstacle, and a second rule according to which if the distance between two obstacles is less than or equal to the visible distance S, a symbol 25B representing a group of obstacles is determined for these obstacles. The separate symbols 25A determined for each of the obstacles according to the first rule are also called single symbols. The symbol 25B representing a group of obstacles is also called group symbol.

Figure 2:
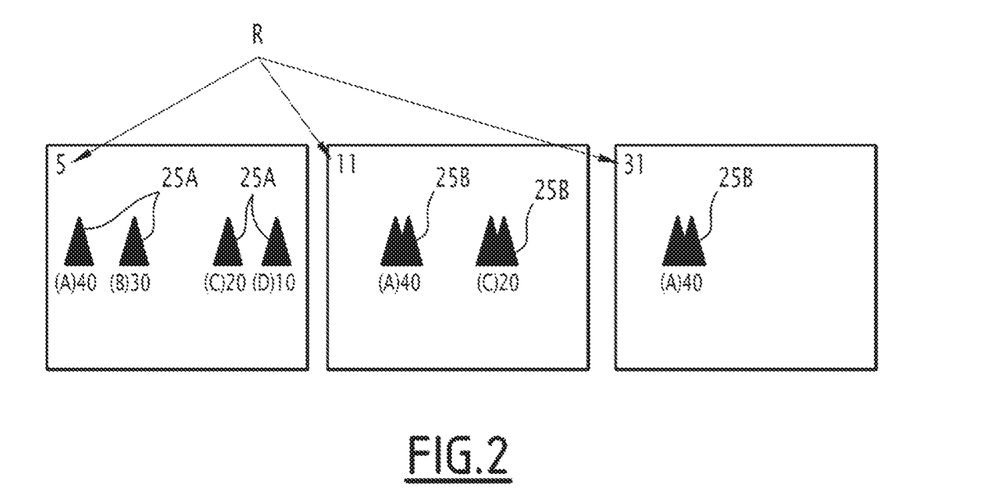
FIG. 2 is a schematic illustration of different examples of views with different symbols representative of obstacles displayed as a function of a variation of a display scale.

FIG. 2 illustrates an exemplary display of these single 25A and group 25B symbols when the display scale R varies. One skilled in the art will observe that the more the display scale R increases, the more the obstacles are shown in the form of group symbol(s) 25B. In the example of FIG. 2, when the display scale R is equal to 5, the four obstacles, respectively identified by the letters A, B, C and D between parentheses, are each shown as a respective single symbol 25A. Then, for the display scale R equal to 11, the obstacles A and B are shown in the form of a first group symbol 25B, the obstacle A also being the obstacle among the obstacles A and B having the highest altitude, namely 40 ft, and the obstacles C and D are shown in the form of a second group symbol 25B, the obstacle C also being the obstacle among the obstacles C and D having the highest altitude, namely 20 ft. Lastly, for the display scale R equal to 31, the four obstacles A, B, C and D are shown in the form of a unique group symbol 25B, the obstacle A also being the obstacle having the highest altitude, in the case at hand 40 ft.

According to the second rule, if the distance between two obstacles is less than or equal to the visible distance threshold S, a unique symbol 25B representative of the group of obstacles is preferably determined for these obstacles. In other words, a unique group symbol 25B is then associated with this group of obstacles if the distance between the obstacles is less than or equal to the visible distance threshold S.

As an optional addition, the determining module 24 is further configured to determine an altitude associated with each displayed obstacle symbol 25A, 25B. In particular, according to the second rule, if the distance between two obstacles is less than or equal to the visible distance threshold S, the altitude associated with the group symbol 25B is then determined as being the highest altitude among the grouped obstacles. Said highest altitude is then associated with the determined group symbol 25B, to be displayed alongside said group symbol 25B. Said altitude is for example expressed in feet.

Each obstacle is for example chosen from among the group consisting of: an individual obstacle, a group of obstacles, a wind turbine and a group of wind turbines. Each obstacle is preferably defined according to appendix 4 of the ICAO, or according to the FAA Aeronautical Chart User's Guide.

The predetermining module 26 is configured to predetermine, for each respective obstacle included in the cartographical data, the first distance ntgd and/or the second distance ndd.

The first distance ntgd is equal to the distance between the respective obstacle and the closest obstacle among the other obstacles, included in the cartographical data, and that have an altitude lower than or equal to that of the respective obstacle. In other words, the first distance ntgd corresponds to the distance of the obstacle closest to the respective obstacle and causing the change of depiction from a single symbol 25A to a respective group symbol 25B, i.e., the lower nearby obstacle that will change the depiction of the respective obstacle from the single symbol 25A to the group symbol 25B indicating that several obstacles are present. The first distance ntgd is for example expressed in nautical miles (Nm).

The second distance ndd is equal to the distance between the respective obstacle and the closest obstacle among the other obstacles, included in the cartographical data, and that have an altitude greater than that of the respective obstacle. In other words, the second distance ndd corresponds to the distance of the obstacle closest to the respective obstacle and that will cause the concealment of the respective obstacle, i.e., the highest obstacle whose display will absorb this respective obstacle. The second distance ndd is for example expressed in nautical miles (Nm).

According to this optional addition, the determining module 24 is then configured, if the first distance ntgd is less than or equal to the visible distance threshold S, to determine a symbol 25B representative of a group of obstacles for at least the respective obstacle and the closest obstacle, the altitude associated with the determined group symbol 25B being greater than or equal to that of the respective obstacle.

Also according to this optional addition, the determining module 24 is configured, if the second distance ndd is less than or equal to the visible distance threshold S, to determine a group symbol 25B for at least the respective obstacle and the closest obstacle, the altitude associated with the determined group symbol 25B then being greater than or equal to that of the closest obstacle.

To predetermine the first and/or second distances ntgd, ndd, for each of the obstacles included in the cartographical data, the predetermining module 26 is for example configured to initialize, for all of the obstacles included in the cartographical data, the first and second distances, ntgd, ndd at a predefined maximal distance, denoted +inf. This predefined maximal distance +inf corresponds to the largest distance processed by the electronic display system 10.

One skilled in the art will observe that if this initialization value is unchanged for each of the distances ntgd and ndd of the obstacles included in the cartographical data, then all of the obstacles are depicted with a respective single symbol 25A. This initialization then makes it possible to guarantee that, by default, no obstacle is absorbed, i.e., depicted in the form of a group symbol 25B in combination with another higher altitude obstacle.

The predetermining module 26 is then configured to implement a recurring processing loop, in which the obstacles included in the cartographical data are processed by pairs of obstacles. For each pair of obstacles, for example identified by the letters A and B in the example of FIGS. 4 to 10, the predetermining module 26 is configured to compute the distance dAB between the two obstacles A and B, this distance dAB preferably being expressed in nautical miles (Nm), then configured to compare the altitude of the obstacle A with that of the obstacle B. One skilled in the art will understand that altitude refers to the elevation of the highest point of the corresponding obstacle.

Figure 4:
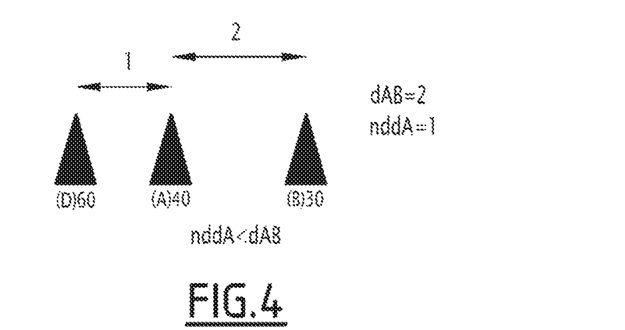
FIGS. 4 to 6 are views illustrating different situations of predetermination of first and second distances for a first obstacle of a pair of obstacles when the altitude of the first obstacle is greater than or equal to that of the second obstacle.

When the altitude of the obstacle A is greater than or equal to that of the obstacle B, this means that the obstacle A can be the obstacle closest to the obstacle B, causing the obstacle B to become an absorbed depiction (i.e., shown in the form of a group symbol 25B in association with another obstacle of higher altitude), and as a corollary that the obstacle B can be the obstacle closest to the obstacle A, causing the obstacle A to enter a grouped depiction (i.e., shown in the form of a group symbol 25B in association with another obstacle of lower altitude), the predetermining module 26 is configured to test whether the second distance nddA associated with the obstacle A is strictly less than the distance dAB between the obstacles A and B, and if applicable configured to maintain, i.e., not to modify, the values of the first and second distances ntgdA and nddA for the obstacle A. Indeed, in this case, as shown in the example of FIG. 4, the obstacle A would already be absorbed before being able to be displayed in a grouped depiction with the obstacle B.

One skilled in the art will observe that, in FIG. 4, as well as in the similar FIGS. 5 to 10, mentioned hereinafter, the number mentioned above each arrow corresponds to the distance embodied by the arrow between the two respective obstacles, expressed in nautical miles (Nm), the letter between parentheses corresponds to the identifier of the respective obstacle, and the number mentioned next to this identifier between parentheses corresponds to the altitude of the respective obstacle, expressed in feet (ft), i.e., the elevation at its highest point.

In order to simplify the drawing in FIGS. 4 to 10, the obstacles have been shown schematically with a same height, although their altitudes are generally different, as is reflected by the numbers of different values next to the different obstacle identifiers in parentheses.

Figure 5:
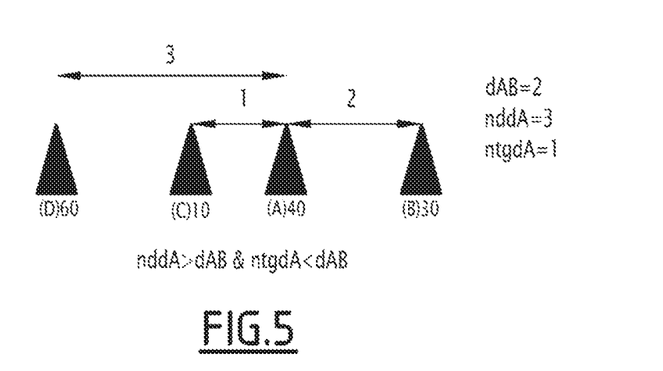

The predetermining module 26 is then configured to test whether the second distance nddA for the obstacle A is greater than or equal to the distance dAB between the obstacles A and B and at the same time, or i.e., cumulatively, whether the first distance ntgdA for the obstacle A is strictly less than the distance dAB between the obstacles A and B, and if applicable configured to maintain, i.e., not to modify, the values of the first and second distances ntgdA, nddA for the obstacle A. Indeed, in this case, as shown in the example of FIG. 5, the obstacle A will already be shown via a group symbol 25B via an obstacle other than the obstacle B.

Figure 6:
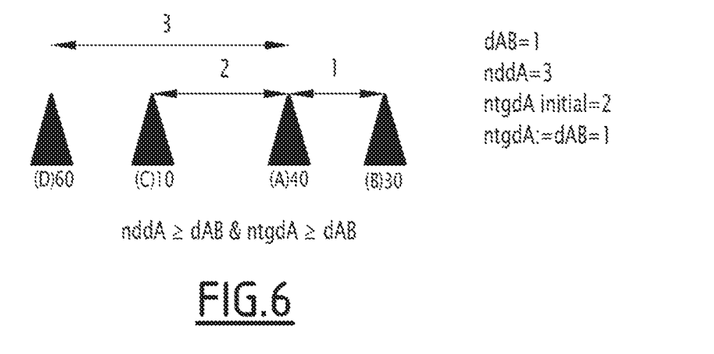

The predetermining module 26 is then configured to test whether the second distance nddA for the obstacle A is greater than or equal to the distance dAB between the obstacles A and B and at the same time, or cumulatively, whether the first distance ntgdA for the obstacle A is greater than or equal to the distance dAB between the obstacles A and B, and if applicable configured to update the first distance ntgdA for the obstacle A with the value of the distance dAB between the obstacles A and B, and configured to maintain, i.e., not to modify, the second distance nddA for the obstacle A. Indeed, as shown in the example of FIG. 6, the obstacle B is then the obstacle closest to the obstacle A capable of being absorbed by the obstacle A and then causing the obstacle A to go from a depiction in the form of a single symbol 25A to a depiction in the form of a respective group symbol 25B.

One skilled in the art will observe that the three preceding paragraphs relate to updating the first and/or second distances ntgdA, nddA for the obstacle A.

Figure 7:
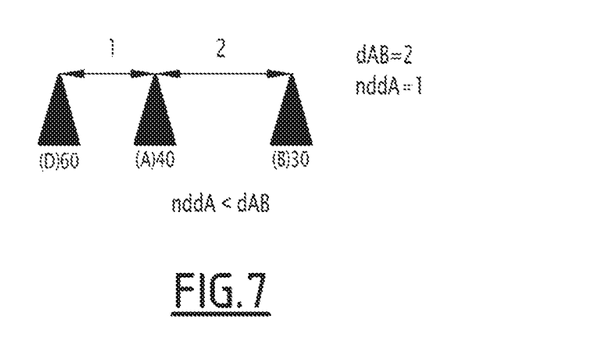
FIGS. 7 to 10 are similar views illustrating the predetermination of the first and second distances for the second obstacle of the pair of obstacles, also when the altitude of the first obstacle is greater than or equal to that of the second obstacle.

To update the first and/or second distances ntgdB, nddB for the obstacle B, the predetermining module 26 is configured to test whether the second distance nddA for the obstacle A is strictly less than the distance dAB between the obstacles A and B, and if applicable to maintain, i.e., not to modify, the values of the first and second distances ntgdB, nddB for the obstacle B. Indeed, in this case, as shown in the example of FIG. 7, the obstacle A would already have been absorbed by another obstacle, and then could not absorb the obstacle B.

Figure 8:
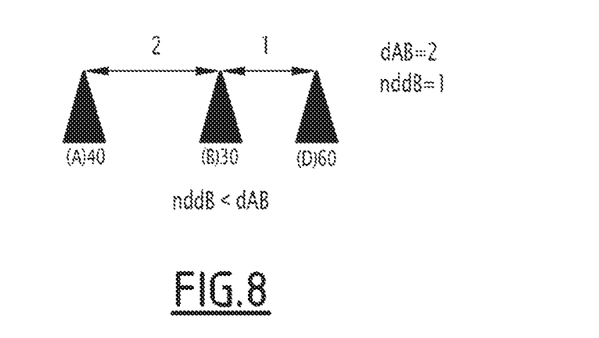

The predetermining module 26 is then configured to test whether the second distance nddB for the obstacle B is strictly less than the distance dAB between the obstacles A and B, and if applicable configured to maintain, i.e., not to modify, the values of the first and second distances ntgdB, nddB for the obstacle B. Indeed, as shown in the example of FIG. 8, the obstacle B would already have been absorbed by an obstacle other than the obstacle A, such that it is not necessary to modify the first and second distances ntgdB, nddB for the obstacle B.

Figure 9:
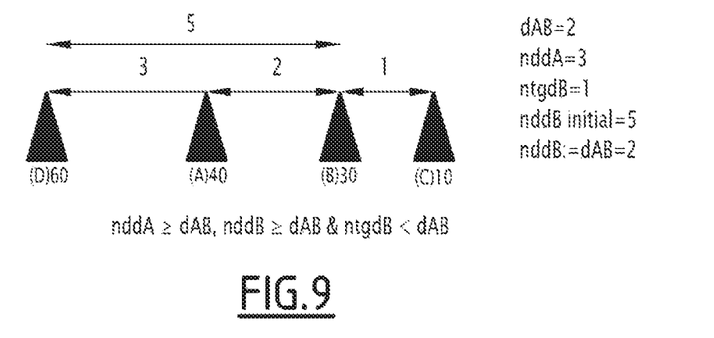

The predetermining module 26 is then configured to test whether the second distance nddA for the obstacle A is greater than or equal to the distance dAB between the obstacles A and B and at the same time, i.e., cumulatively, whether the second distance nddB for the obstacle B is greater than or equal to the distance dAB between the obstacles A and B, and also at the same time, i.e., also cumulatively, whether the first distance ntgdB for the obstacle B is strictly less than the distance dAB between the obstacles A and B, the predetermining module 26 if applicable being configured to update the second distance nddB for the obstacle B with the value of the distance dAB between the obstacles A and B, and configured to maintain, i.e., not to modify, the first distance ntgdB for the obstacle B. Indeed, as shown in the example of FIG. 9, the obstacle A would in this case be the closest obstacle causing the absorption of the obstacle B.

Figure 10:
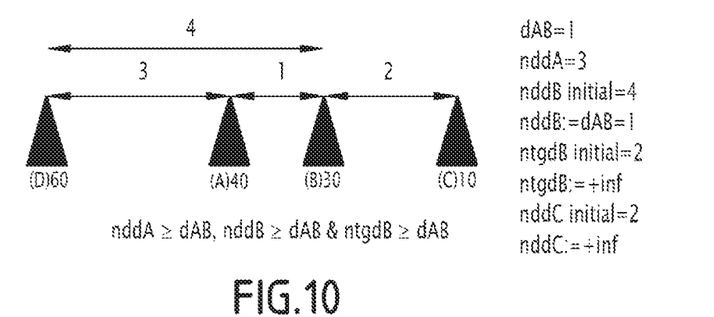

The predetermining module 26 is then configured to test whether the second distance nddA for the obstacle A is greater than or equal to the distance dAB between the obstacles A and B and at the same time, i.e., cumulatively, whether the second distance nddB for the obstacle B is greater than or equal to the distance dAB between the obstacles A and B, and also at the same time, i.e., also cumulatively, whether the first distance ntgdB for the obstacle B is greater than or equal to the distance dAB between the obstacles A and B, the predetermining module 26 if applicable being configured to update the second distance nddB for the obstacle B with the value of the distance dAB between the obstacles A and B, and configured to update the first distance ntgdB for the obstacle B with the value equal to the maximum predefined distance +inf, and also configured to update the second distance nddC for another obstacle C with the value equal to the maximum predefined distance +inf. One skilled in the art will understand that the obstacle C is the preceding obstacle that caused the obstacle B to go to a grouped depiction. Indeed, as shown in the example of FIG. 10, the obstacle A is the closest obstacle causing the absorption of the obstacle B, the obstacle A also being closer to the obstacle B than the preceding obstacle C that caused the obstacle B to transition to grouped depiction. The obstacle B is therefore absorbed before being able to be displayed in grouped depiction in this case.

When the altitude of the obstacle A is strictly less than that of the obstacle B, this means that the obstacle A can be the obstacle closest to the obstacle B, causing the obstacle B to become an grouped depiction, and as a corollary that the obstacle B can be the obstacle closest to the obstacle A, causing the obstacle A to enter an absorbed depiction, the predetermining module 26 is configured to conduct tests and updates that are corollaries to those previously described when the altitude of the obstacle A is greater than or equal to that of the obstacle B.

To update the first and/or second distances ntgdA, nddA for the obstacle A, the predetermining module 26 is configured to test whether the second distance nddB for the obstacle B is strictly less than the distance dAB between the obstacles A and B, and if applicable to maintain, i.e., not to modify, the values of the first and second distances ntgdA, nddA for the obstacle A. Indeed, in this case, the obstacle B would already have been absorbed by another obstacle, and then could not absorb the obstacle A.

The predetermining module 26 is then configured to test whether the second distance nddA for the obstacle A is strictly less than the distance dAB between the obstacles A and B, and if applicable configured to maintain, i.e., not to modify, the values of the first and second distances ntgdA, nddA for the obstacle A. Indeed, the obstacle A would already have been absorbed by an obstacle other than the obstacle B, such that it is not necessary to modify the first and second distances ntgdA, nddA for the obstacle A.

The predetermining module 26 is then configured to test whether the second distance nddB for the obstacle B is greater than or equal to the distance dAB between the obstacles A and B and at the same time, i.e., cumulatively, whether the second distance nddA for the obstacle A is greater than or equal to the distance dAB between the obstacles A and B, and also at the same time, i.e., also cumulatively, whether the first distance ntgdA for the obstacle A is strictly less than the distance dAB between the obstacles A and B, the predetermining module 26 if applicable being configured to update the second distance nddA for the obstacle A with the value of the distance dAB between the obstacles A and B, and configured to maintain, i.e., not to modify, the first distance ntgdA for the obstacle A. Indeed, the obstacle B would in this case be the closest obstacle causing the absorption of the obstacle A.

The predetermining module 26 is then configured to test whether the second distance nddB for the obstacle B is greater than or equal to the distance dAB between the obstacles A and B and at the same time, i.e., cumulatively, whether the second distance nddA for the obstacle A is greater than or equal to the distance dAB between the obstacles A and B, and also at the same time, i.e., also cumulatively, whether the first distance ntgdA for the obstacle A is greater than or equal to the distance dAB between the obstacles A and B, the predetermining module 26 if applicable being configured to update the second distance nddA for the obstacle A with the value of the distance dAB between the obstacles A and B, and configured to update the first distance ntgdA for the obstacle A with the value equal to the maximum predefined distance +inf, and also configured to update the second distance nddC for another obstacle C with the value equal to the maximum predefined distance +inf. One skilled in the art will understand that the obstacle C is the preceding obstacle that caused the obstacle A to go to a grouped depiction. Indeed, the obstacle B is the closest obstacle causing the absorption of the obstacle A, the obstacle B also being closer to the obstacle A than the preceding obstacle C that caused the obstacle A to transition to grouped depiction. The obstacle A is therefore absorbed before being able to be displayed in grouped depiction in this case.

To update the first and second distances ntgdB, nddB for the obstacle B, the predetermining module 26 is configured to test whether the second distance nddB associated with the obstacle B is strictly less than the distance dAB between the obstacles A and B, and if applicable configured to maintain, i.e., not to modify, the values of the first and second distances ntgdB and nddB for the obstacle B. Indeed, in this case, the obstacle B would already have been absorbed before being able to be displayed in a group depiction with the obstacle A.

The predetermining module 26 is then configured to test whether the second distance nddB for the obstacle B is greater than or equal to the distance dAB between the obstacles A and B and at the same time, or i.e., cumulatively, whether the first distance ntgdB for the obstacle B is strictly less than the distance dAB between the obstacles A and B, and if applicable configured to maintain, i.e., not to modify, the values of the first and second distances ntgdB, nddB for the obstacle B. Indeed, in this case, the obstacle B will already be shown via a group symbol 25B via an obstacle other than the obstacle A.

The predetermining module 26 is then configured to test whether the second distance nddB for the obstacle B is greater than or equal to the distance dAB between the obstacles A and B and at the same time, or cumulatively, whether the first distance ntgdB for the obstacle B is greater than or equal to the distance dAB between the obstacles A and B, and if applicable configured to update the first distance ntgdB for the obstacle B with the value of the distance dAB between the obstacles A and B, and configured to maintain, i.e., not to modify, the second distance nddB for the obstacle B. Indeed, the obstacle A is then the obstacle closest to the obstacle B capable of being absorbed by the obstacle B and then causing the obstacle B to go from a depiction in the form of a single symbol 25A to a depiction in the form of a respective group symbol 25B.

The determining module 24 is then, for each obstacle included in the cartographical data, and in particular for each obstacle present in the visible zone of the map, configured to determine whether the symbol associated with the respective obstacle is the single symbol 25A or the group symbol 25B, and optionally in the latter case, to determine whether the respective obstacle is in absorbed depiction or in grouped depiction.

The determining module 24 is then for example configured to compare the visible distance threshold S with the first distance ntgd for the respective obstacle and/or with the second distance ndd for the respective obstacle. If the visible distance threshold S is greater than or equal to the first distance ntgd for the respective obstacle, then the symbol associated with this respective obstacle is the group symbol 25B, the respective obstacle further being shown grouped, i.e., the altitude of the respective obstacle is greater than that of the other obstacle(s) belonging to the group of obstacles depicted by said group symbol 25B. If the visible distance threshold S is greater than or equal to the second distance ndd for the respective obstacle, then the symbol associated with said respective obstacle is the group symbol 25B, the respective obstacle further being shown absorbed, i.e., the altitude of the respective obstacle is not the highest among the obstacles belonging to the group of obstacles depicted by said group symbol 25B. If the visible distance threshold S is strictly less than the first distance ntgd and also strictly less than the second distance ndd for the respective obstacle, then the symbol associated with said respective obstacle is the single symbol 25A. In this last case, said respective obstacle is then shown in the form of a symbol 25A separate from the other symbols associated with the other obstacles included in the cartographical data.

In a variant, the determining module 24 is further configured to compute, for each respective obstacle included in the cartographical data, a first property ntgr dependent on the first distance ntgd predetermined by the predetermining module 26 and/or a second property ndr dependent on the second distance ndd predetermined by the predetermining module 26. The first property ntgr and/or the second property ndr for example depend on the length X of the diagonal 36, as well as the length Y of the radius 38 of the circle 40.

According to this variant, the determining module 24 is then for example configured to compute the first property ntgr according to the following equation:

$$ntgr = ntgd \times \frac{X}{Y} \qquad (2)$$

where ntgd represents the first distance for the respective obstacle,

X and Y represent the lengths previously described.

The determining module 24 is then for example configured to compute the second property ndr according to the following equation:

$$ndr = ndd \times \frac{X}{Y} \qquad (3)$$

where ndd represents the second distance for the respective obstacle,

X and Y represent the lengths previously described.

According to this variant, the determining module 24 is then configured to compare the display scale R with the first property ntgr and/or the second property ndr for each of the obstacles included in cartographical data, in particular for each obstacle present in the visible zone of the map, in order to determine the respective symbol associated with the corresponding obstacle.

According to this variant, the determining module 24 is then for example configured to test whether the display scale R is greater than or equal to the first property ntgr for the respective obstacle, and to determine, if applicable, whether the symbol associated with the respective obstacle is the group symbol 25B, the respective obstacle then being in a grouped depiction.

According to this variant, the determining module 24 is configured to test whether the display scale R is greater than or equal to the first property ntgr for the respective obstacle, and to determine, if applicable, whether the symbol associated with the respective obstacle is the group symbol 25B, the respective obstacle then being in a grouped depiction.

According to this variant, the determining module 24 is configured to test whether the display scale R is strictly less than the first property ntgr and strictly less than the second property ndr for the respective obstacle, and if applicable to determine whether the symbol associated with said respective obstacle is the single symbol 25A.

The display module 28 is then configured to display the aeronautical map on the display screen 14, in particular the set of symbols representing obstacle(s) 25A, 25B, determined by the determining module 24.

Figure 11:
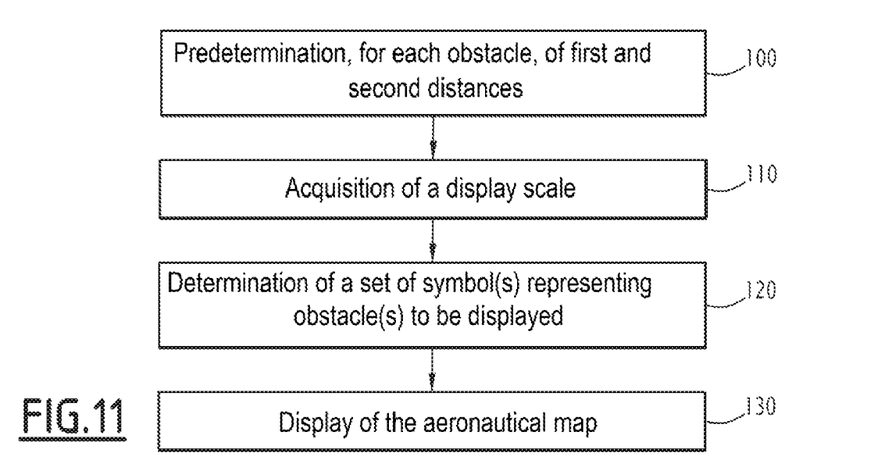
FIG. 11 is a flowchart of a method, according to the invention, for managing the display of the aeronautical map.

The operation of the electronic display system 10 according to the invention, and in particular of the electronic display device 20, will now be explained using FIG. 11 showing a flowchart of the method, according to the invention, for managing the display of the aeronautical map.

During an initial step 100, the management device 20 predetermines, via its predetermining module 26 and for each obstacle included in the cartographical data, the first and/or second distance ntgd, ndd, and preferably both the first and second distances ntgd, ndd. The predetermining module 26 for example performs the tests as previously described in light of FIGS. 4 to 10.

The electronic management device 20 acquires, during step 110 and via its computing module 22, the display scale R. As an optional addition, the computing module 22 computes, during this step 110 and as a function of the display scale R, the visible distance threshold S, for example using equation (1).

During the following step 120, the management device 20 determines, via its determining module 24, the set of symbol(s) representing obstacle(s) 25A, 25B to be displayed. This determination is for example done by comparing the visible distance threshold S with the first distance ntgd and/or the second distance ndd for each obstacle included in the cartographical data, in particular for each obstacle present in the visible zone of the map. Based on the result of this comparison, the determined symbol is then, as previously described, the single symbol 25A or the group symbol 25B.

In a variant, this determination is done by comparing the display scale R to the first property ntgr and/or to the second property ndr for each obstacle included in the cartographical data, in particular for each obstacle present in the visible zone of the map.

The management device 20 lastly displays, during step 130 and via its display module 28, the aeronautical map on the screen 14, in particular the set of symbol(s) representing obstacle(s) 25A, 25B determined during step 120.

Thus, the electronic management device 20 and the display management method according to the invention make it possible to improve the display of obstacles included in the cartographical data, during the display of the aeronautical map, and in particular to display the obstacles in a grouped manner via the group symbol 25B when the distance between two obstacles is less than or equal to the visible distance threshold S. This group symbol 25B then makes it possible to indicate the presence of several obstacles, while preventing the respective symbols of the obstacles from being displayed in a superimposed or slightly offset manner, which is generally difficult to read, or even unreadable, in particular when the value of the display scale R is high.

The electronic management device 20 and the management method according to the invention then make it possible to prevent the user and the pilot of the aircraft 12 from undervaluing a danger resulting from the presence of several obstacles, each respective obstacle representing a potential danger for the aircraft 12.

The invention claimed is:

1. A method for managing the display of an aeronautical map from cartographical data, the method being implemented by an electronic management device and comprising the following steps:
acquiring a display scale of the aeronautical map;
determining a set of symbols representative of obstacles to be displayed, the obstacles being included in the cartographical data, where for any two obstacles of the obstacles:
if a distance between two obstacles is greater than a distance threshold that depends on the display scale, two separate symbols are determined for the two obstacles, each being representative of a respective obstacle, and
if the distance between the two obstacles is less than or equal to the distance threshold, a symbol representative of a grouping of obstacles is determined for the two obstacles,
the method further comprising a step for predetermining, for each respective obstacle included in the cartographical data, a first distance equal to a distance between the respective obstacle and a closest obstacle among a remainder of the obstacles, included in the cartographical data, that have an altitude lower than or equal to that of the respective obstacle, and
during the determining step, if the first distance is less than or equal to the distance threshold, a group symbol is determined for at least the respective obstacle and the closest obstacle, the altitude associated with the determined representative symbol being greater than or equal to that of the respective obstacle.

2. The method according to claim 1, wherein, if the distance between two obstacles is less than or equal to the distance threshold, a unique symbol associated with said grouped obstacles is determined for the two obstacles.

3. The method according to claim 1, wherein, if the distance between two obstacles is less than or equal to the distance threshold, the highest altitude among the grouped obstacles is further associated with the determined representative symbol, to be displayed next to said symbol.

4. The method according to claim 1, wherein each obstacle is chosen from among the group consisting of: an individual obstacle, a group of obstacles, a wind turbine and a group of wind turbines.

5. The method according to claim 4, wherein each obstacle is chosen according to appendix 4 of the ICAO or the FAA Aeronautical Chart User's Guide.

6. The method according to claim 1, wherein the method further comprises a step for displaying the aeronautical map, the displayed map including the determined set of symbols representing obstacles.

7. A non-transitory computer-readable medium including a computer program comprising software instructions which, when executed by a computer, carry out a method according to claim 1.

8. A method for managing the display of an aeronautical map from cartographical data, the method being implemented by an electronic management device and comprising the following steps:

acquiring a display scale of the aeronautical map;
determining a set of symbols representative of obstacles to be displayed, the obstacles being included in the cartographical data, where for any two obstacles of the obstacles:
if a distance between two obstacles is greater than a distance threshold that depends on the display scale, two separate symbols are determined for the two obstacles, each being representative of a respective obstacle, and
if the distance between two obstacles is less than or equal to the distance threshold, a symbol representative of a grouping of obstacles is determined for the two obstacles,
the method further comprising a step for predetermining, for each respective obstacle included in the cartographical data, a second distance equal to a distance between the respective obstacle and a closest obstacle among a remainder of the obstacles, included in the cartographical data, that have an altitude greater than that of the respective obstacle, and
during the determining step, if the second distance is less than or equal to the distance threshold, a group symbol is determined for at least the respective obstacle and the closest obstacle, the altitude associated with the determined representative symbol then being greater than or equal to that of the closest obstacle.

9. The method according to claim 8, wherein, if the distance between two obstacles is less than or equal to the distance threshold, a unique symbol associated with said grouped obstacles is determined for the two obstacles.

10. The method according to claim 8, wherein, if the distance between two obstacles is less than or equal to the distance threshold, the highest altitude among the grouped obstacles is further associated with the determined representative symbol, to be displayed next to said symbol.

11. The method according to claim 8, wherein each obstacle is chosen from among the group consisting of: an individual obstacle, a group of obstacles, a wind turbine and a group of wind turbines.

12. The method according to claim 11, wherein each obstacle is chosen according to appendix 4 of the ICAO or the FAA Aeronautical Chart User's Guide.

13. The method according to claim 8, wherein the method further comprises a step for displaying the aeronautical map, the displayed map including the determined set of symbols representing obstacles.

14. A non-transitory computer-readable medium including a computer program comprising software instructions which, when executed by a computer, carry out a method according to claim 8.

15. An electronic management device configured to manage the display of an aeronautical map from cartographical data, comprising:
a computing module implemented by a processor configured to acquire a display scale of the aeronautical map;
a determining module implemented by the processor configured to determine a set of symbols representative of obstacles to be displayed, the obstacles being included in the cartographical data, where for any two obstacles of the obstacles:
if a distance between two obstacles is greater than a distance threshold that depends on the display scale, two separate symbols are determined for the two obstacles, each being representative of a respective obstacle, and
if the distance between the two obstacles is less than or equal to the distance threshold, a symbol representative of a grouping of obstacles is determined for these the two obstacles,
the device further comprising a predetermining module configured to predetermine, for each respective obstacle included in the cartographical data, a first distance equal to a distance between the respective obstacle and a closest obstacle among a remainder of the obstacles, included in the cartographical data, that have an altitude lower than or equal to that of the respective obstacle, and
the determining module being configured, if the first distance is less than or equal to the distance threshold, to determine a group symbol for at least the respective obstacle and the closest obstacle, the altitude associated with the determined representative symbol being greater than or equal to that of the respective obstacle.

16. An electronic management device configured to manage the display of an aeronautical map from cartographical data, comprising:
a computing module implemented by a processor configured to acquire a display scale of the aeronautical map;
a determining module implemented by the processor configured to determine a set of symbols representative of obstacles to be displayed, the obstacles being included in the cartographical data, where for any two obstacles of the obstacles:
if a distance between two obstacles is greater than a distance threshold that depends on the display scale, two separate symbols are determined for the two obstacles, each being representative of a respective obstacle, and
if the distance between the two obstacles is less than or equal to the distance threshold, a symbol representative of a grouping of obstacles is determined for the two obstacles,
the device further comprising a predetermining module configured to predetermine, for each respective obstacle included in the cartographical data, a second distance equal to a distance between the respective obstacle and a closest obstacle among a remainder of the obstacles, included in the cartographical data, that have an altitude greater than that of the respective obstacle, and
the determining module being configured, if the second distance is less than or equal to the distance threshold, to determine a group symbol for at least the respective obstacle and the closest obstacle, the altitude associated with the determined symbol then being greater than or equal to that of the closest obstacle.

* * * * *